Figure 1:
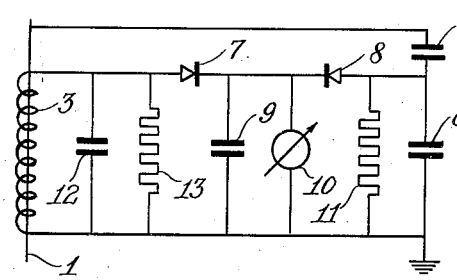

April 19, 1949.   J. W. ALEXANDER   2,467,648
TRANSMISSION LINE ENERGY INDICATOR
Filed May 2, 1946

JOHAN W. ALEXANDER.
INVENTOR.

BY

ATTORNEY.

Patented Apr. 19, 1949

2,467,648

UNITED STATES PATENT OFFICE 2,467,648

TRANSMISSION LINE ENERGY INDICATOR

Johan Willem Alexander, Eindhoven, Netherlands, assignor, by mesne assignments to Hartford National Bank and Trust Company, Hartford, Conn., as trustee Application May 2, 1946, Serial No. 666,558
In the Netherlands August 5, 1942

Section 1, Public Law 690, August 8, 1946
Patent expires August 5, 1962

5 Claims. (Cl. 171—95)

This invention relates to a device for detecting, by means of an indicating instrument, the transmission of high-frequency energy through a conductor wherein standing waves appear. The invention may be used with particular advantage in radio transmitting devices having an adjustable operating frequency.

In radio transmitting devices having an adjustable operating frequency difficulties are experienced in certain cases in providing an antenna-current indicator required for controlling the flow of antenna-current and/or for tuning the antenna, viz. when the antenna-current indicator must be connected to a conductor wherein standing waves appear. In this case the sensitiveness of the indicator largely depends on the operating frequency and this sometimes to such a degree that the indicator is not or substantially not operable for one or more definite frequencies.

The primary object of this invention is to avoid the abovementioned drawbacks by providing a high frequency energy indicator which is independent of standing waves and the frequency of energy appearing on the transmission line to which the indicator is coupled.

To this end, according to the invention, the indicating instrument is controlled by two measuring voltages, one of which (first) depends on the current appearing at any point on the transmission line, whereas the other (second) measuring voltage depends on the high-frequency voltage appearing at or near the same point on the line.

When making use of the invention the indicating instrument will always give an indication since, of course, a current node and a voltage node can never appear simultaneously at one and the same point on the transmission line exhibiting the standing waves. Thus, the measuring voltages derived at the point of connection from the current and voltage there appearing will normally cause indications supporting each other, whereas in the case of the point of connection being located in a current node or voltage node the measuring voltage corresponding thereto will disappear. However the other measuring voltage will be maximum at this point so that a clear indication will still be obtained.

The two measuring voltages need not be taken from exactly the same point of the high-frequency line. However, for obtaining a reliable indication the distance between the points, from which the two measuring voltages are taken respectively, should be chosen smaller than about one quarter of the smallest operating wavelength to be expected.

In order to avoid direct electrical connections with the conductor conveying high-frequency energy the first measuring voltage is preferably taken from a high-frequency transformer, whereas the second measuring voltage is taken from a capacitative potentiometer.

The indicating instrument preferably consists of a sensitive direct current meter to which the measuring voltages, after rectification, are so supplied as to support each other.

Figure 3:
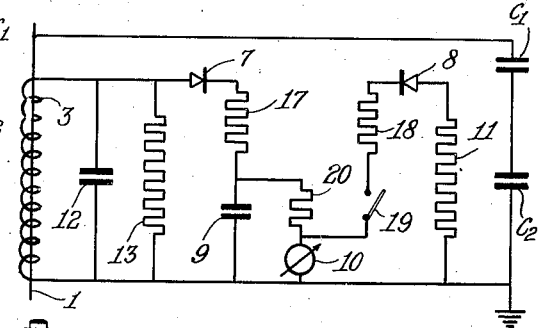
Figure 2:
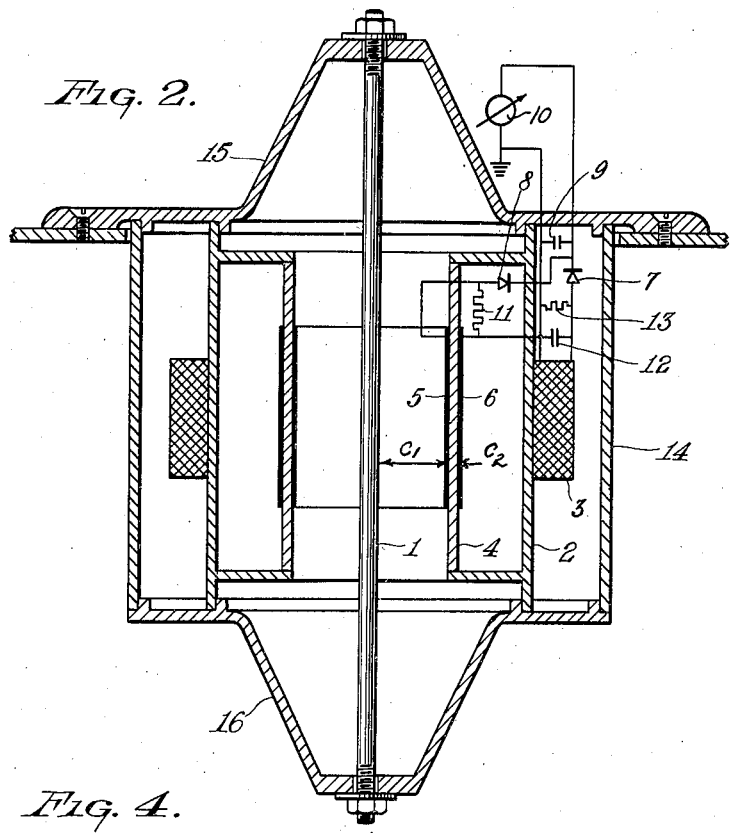
Figure 4:
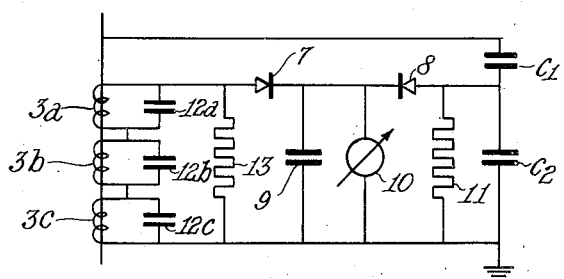
Figure 4:

The invention will be more fully explained by reference to Figures 1 and 2 representing respectively the circuit arrangement and the construction of a particularly suitable form of construction of the device according to the invention, Fig. 3 representing an improved circuit arrangement. Fig. 4 represents another improved circuit arrangement.

In Figures 1 and 2 the reference number 1 designates one conductor transmission line forming part of the antenna circuit of a radio transmitting device having an operating frequency which is adjustable within a broad range of frequencies, say several megacycles. Standing waves of the operating wavelength appear on the conductor. In this case the ground in effect serves as the other conductor. It will be obvious, however, that the transmission line may consist of a pair of conductors.

The conductor 1 is surrounded by a toroidal measuring winding 3 which is wound about a tubular form 2. Winding 3 together with the conductor 1 constitutes a high-frequency transformer. Furthermore two cylindrical condenser plates 5, 6 supported on the opposite walls of a tubular dielectric 4 are arranged concentrically with the conductor 1. Plates 5 and 6 together with the conductor 1 constitute a capacitative potentiometer consisting of the condensers $C_1$ and $C_2$.

In the illustrated arrangement a voltage (first measuring voltage), which is proportional to the high-frequency current in the part of the conductor 1 surrounded by the measuring winding 3, appears at the measuring winding 3, whereas the voltage set up at the condenser $C_2$ (second measuring voltage) is proportional to the high-frequency voltage prevailing in the same conductor part.

After having been rectified, which may be effected by means of dry rectifiers 7 and 8 respectively, and after having been filtered by means of a condenser 9, the said two measuring voltages are supplied in the same sense to a direct current meter 10. To complete the rectifying circuit for the second measuring voltage the condenser $C_2$ is bridged by a resistance 11.

By means of the illustrated device an indication of the energy transmitted by the conductor is obtained over a broad range of frequencies of say 1 to 10 megacycles.

In view of quantitative measurements it is advantageous to make the device such that the indication sensitiveness is as much as possible independent of the adjusted operating frequency.

In regard to the first measuring voltage this can be achieved by connecting in parallel with the measuring winding 3 a condenser 12 having such a value that the created resonant circuit is tuned to the frequency corresponding to the geometrical mean proportional of the limiting frequencies of the range of frequencies to be covered and by subsequent strong damping of this resonant circuit 3, 12 by means of a resistance 13.

The range of frequencies, within which a uniform sensitiveness is obtained in regard to the first measuring voltage may, if desired, be extended by taking the first measuring voltage from the series-connected measuring windings of a plurality of high-frequency transformers, the measuring windings forming part of a corresponding number of resonant circuits tuned to different frequencies. This modification is illustrated in Fig. 4 which is similar to Fig. 1 except that winding 3 is now comprised of a plurality of series-connected windings $3_a$, $3_b$ and $3_c$ each shunted by a condenser $12_a$, $12_b$ and $12_c$, respectively, to form a parallel resonant circuit therewith. Each parallel resonant circuit is tuned to a different frequency within the desired range whereby a uniform response is obtained throughout said range.

In regard to the second measuring voltage care should be taken, in order that in the represented device the sensitiveness shall be substantially independent of the frequency, that the resistance of the measuring circuit connected in parallel with the condenser $C_2$, i. e. the resistance 11, has a sufficient value so that the natural frequency independence of the capacitative potentiometer $C_1$, $C_2$ is substantially conserved.

Fig. 2 illustrates in a partially sectional view a preferred embodiment of a unitary structure incorporating all the elements in the circuit of Fig. 1 with the exception of the direct current meter 10. The structure is in the form of a lead-through insulator and is adapted for insertion at any convenient point in a high frequency line. The tubular dielectric 4, supporting plates 5 and 6, and the tubular form about which toroid 3 is wound are arranged concentrically about central conductor 1 and are surrounded by a cylindrical envelope 4. The opposite ends of the cylindrical structure are enclosed by stand-off insulators 15 through which conductor 1 extends. The remaining element of the circuit is housed within the structure at suitable positions and leads are extended therefrom for connection to meter 10. The structure in conjunction with meter 10 provides a high-frequency energy indicator which is responsive regardless of the existence of standing waves on the line and is independent of the line frequency within the prescribed range.

Due to interference between the circuits for the first and second measuring voltage an indication dependent to some degree on the applied frequency still occurs in the forms of construction represented in Figures 1 and 2.

The latter can be eliminated when making use of the circuit shown in Fig. 3, in which the two measuring voltages are supplied to the measuring instrument through the intermediary of separate series resistances 17 and 18 respectively.

If desired, changing over of the measuring range of the device can be effected in a very simple manner by making use of a series resistance 20 which is common to the two measuring voltages and can be short circuited by means of a switch 19.

What I claim is:

1. An arrangement for indicating high-frequency energy in a transmission line having two conductors for conveying a predetermined frequency range of wave energy to a load, standing waves appearing on said line, said arrangement comprising a coil surrounding one conductor of said line at any first point thereon to derive a first measuring voltage whose amplitude is a function of the high frequency current existing at said first point, a capacitor having a pair of plates, one plate being capacitatively coupled to said one conductor at a second point thereon whose spacing from the first point is less than a half wavelength of the lowest frequency in said range, the other plate being connected to the other conductor to thereby form a capacitative potentiometer to derive a second measuring voltage whose amplitude is a function of the high-frequency voltage existing at said second point, means to rectify separately said first and second measuring voltages, direct-current indicating means, and means to apply in the same polarity said rectified first and second measuring voltages to said direct-current indicating means.

2. An arrangement for indicating high-frequency energy in a transmission line having two conductors for conveying a predetermined frequency range of wave energy to a load, standing waves appearing on said line, said arrangement comprising a coil surrounding one conductor of said line at any first point thereon to derive a first measuring voltage whose amplitude is a function of the high-frequency current existing at said first point, a first capacitor shunted across said coil, the value of said first capacitor being such as to constitute with said coil a circuit resonant at the mean frequency of said range, a second capacitor having two plates, one plate being capacitatively coupled to said one conductor at a second point thereon whose spacing from the first point is less than a half wavelength of the lowest frequency in said range, the other plate being connected to the other conductor to thereby form a capacitative potentiometer to derive a second measuring voltage whose amplitude is a function of the high-frequency voltage existing at said second point, means to rectify separately said first and second measuring voltages, direct-current indicating means, and means to apply in the same polarity said rectified first and second measuring voltages to said direct-current indicating means.

3. An arrangement for indicating high-frequency energy in a transmission line having two conductors for conveying a predetermined frequency range of wave energy to a load, standing waves appearing on said line, said arrangement comprising a coil surrounding one conductor of said line at any first point thereon to derive a first measuring voltage whose amplitude is a function of the high-frequency current existing at said first point, a first capacitor shunted across said coil, the value of said first capacitor being such as to constitute with said coil a circuit resonant at the main frequency of said range, a damping resistor connected across said resonant circuit, the value of said resistor being such as to provide a substantially uniform response throughout said frequency range, a second capacitor having two plates, one plate being capacitatively coupled to said one conductor at a second point thereon whose spacing from the first point is less than a half wavelength of the lowest frequency in said range, the other plate being connected to the other conductor to thereby form a capacitative potentiometer to derive a second measuring voltage whose amplitude is a function of the high-frequency voltage existing at said second point, means to rectify separately said first and second measuring voltages, direct-current indicating means, and means to apply in the same polarity said rectified first and second measuring voltages to said direct-current indicating means.

4. An arrangement for indicating high frequency energy on a transmission line having two conductors for conveying a predetermined frequency range of wave energy to a load, standing waves appearing on said line, said arrangement comprising a toroidal coil surrounding one conductor of said line at any first point thereon to derive a first measuring voltage whose amplitude is a function of the high-frequency current existing at said first point, a first capacitor shunted across said coil the value of said first capacitor being such as to constitute with said coil a circuit resonant at the mean frequency of said range, a damping resistor connected across said resonant circuit, the value of said resistor being such as to provide a substantially uniform response throughout said frequency range, a second capacitor having two plates, a resistance element connected across said second capacitor, one plate of said second capacitor being capacitatively coupled to said one conductor at a second point thereon whose spacing from said first point is less than a half wavelength of the lowest frequency in said range, the other plate being connected to the other conductor to thereby form a capacitative potentiometer which establishes across said resistance element a second measuring voltage whose amplitude is a function of the high-frequency voltage existing at said second point, means to rectify separately said first and second measuring voltages, direct-current indicating means, means to apply in the same polarity said rectified first and second measuring voltages to said direct-current indicating means, and a third capacitor connected across said indicating means for filtering the applied voltages.

5. An arrangement for indicating high frequency energy on a transmission line having two conductors for conveying a predetermined frequency range of wave energy to a load, standing waves appearing on said line, said arrangement comprising a first capacitor having two coaxial cylindrical plates concentrically arranged about one conductor of the line at any position thereon, the outer plate being connected to the other conductor of the line to thereby form a capacitative potentiometer to derive a first measuring voltage whose amplitude is a function of the current existing at the position of said first capacitor on the line, a toroidal coil surrounding said outer plate and concentrically arranged with respect to said one conductor, said coil deriving a second measuring voltage whose amplitude is a function of the high-frequency voltage existing at said position on the line, means to rectify separately said first and second measuring voltages, a direct-current indicator, and means to apply said rectified voltages to said direct-current indicator.

JOHAN WILLEM ALEXANDER.

REFERENCES CITED

The following references are of record in the file of this patent:

UNITED STATES PATENTS

| Number | Name | Date |
|---|---|---|
| 2,134,589 | Stanek | Oct. 25, 1938 |
| 2,157,006 | Oesinghaus | May 2, 1939 |
| 2,165,848 | Gothe et al. | July 11, 1939 |
| 2,238,298 | Wehrlin | Apr. 15, 1941 |
| 2,297,255 | Schulze-Herringen et al. | Sept. 29, 1942 |
| 2,344,641 | Rosencrans | Mar. 21, 1944 |
| 2,362,372 | Halfmann | Nov. 7, 1944 |